April 20, 1943.  A. GAZDA  2,317,267
AIRCRAFT WING SYSTEM
Filed March 15, 1940   2 Sheets-Sheet 1

Fig.2ª

Patented Apr. 20, 1943

2,317,267

UNITED STATES PATENT OFFICE 2,317,267

AIRCRAFT WING SYSTEM

Antoine Gazda, Neuilly-sur-Seine, France; vested in the Alien Property Custodian Application March 15, 1940, Serial No. 324,197
In Switzerland February 8, 1940

4 Claims. (Cl. 244—43)

The present invention concerns an aircraft wing system consisting of a main wing and at least of one raisable and lowerable auxiliary wing, for which on the upper side of the main wing a cavity is provided, into which the auxiliary wing can be lowered down from its raised position in such a manner that the upper surfaces of both wings will be at the same level when the auxiliary wing is lowered down into the said cavity.

Figure 1:
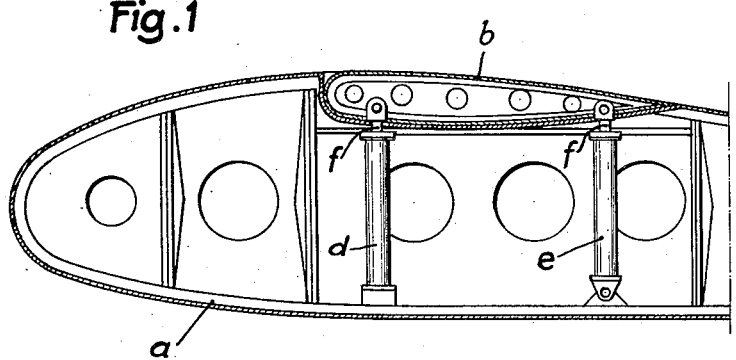
Figure 2:
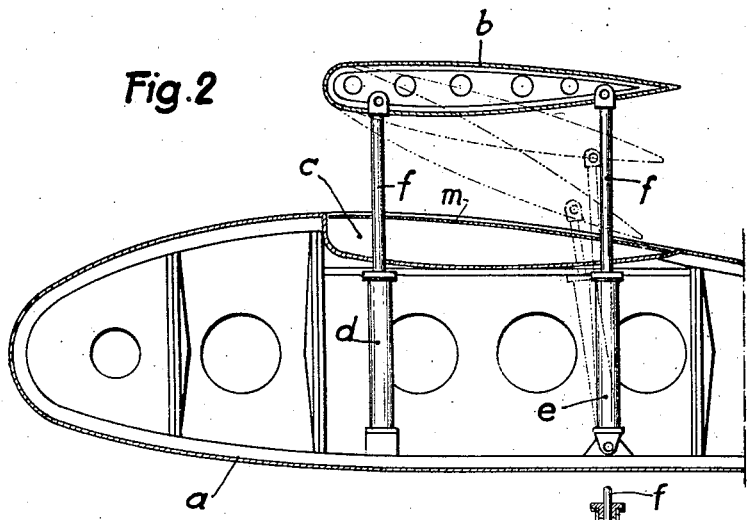
Figure 2:
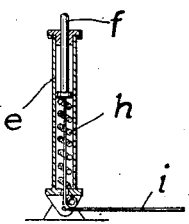

In order that the invention may be fully understood, an embodiment of the invention will now be described by way of example with reference to the accompanying drawings, wherein:

Fig. 1 and 2 are cross sectional views through an aeroplane wing in two different positions of the auxiliary wing.

Fig. 2ª shows a detail.

Figure 3:
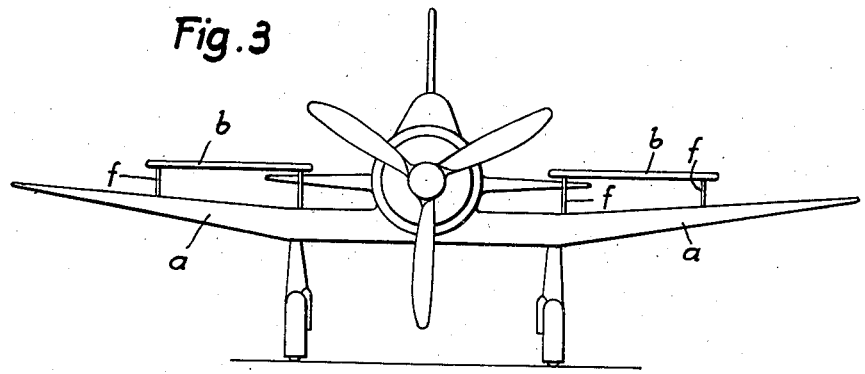
Figure 4:
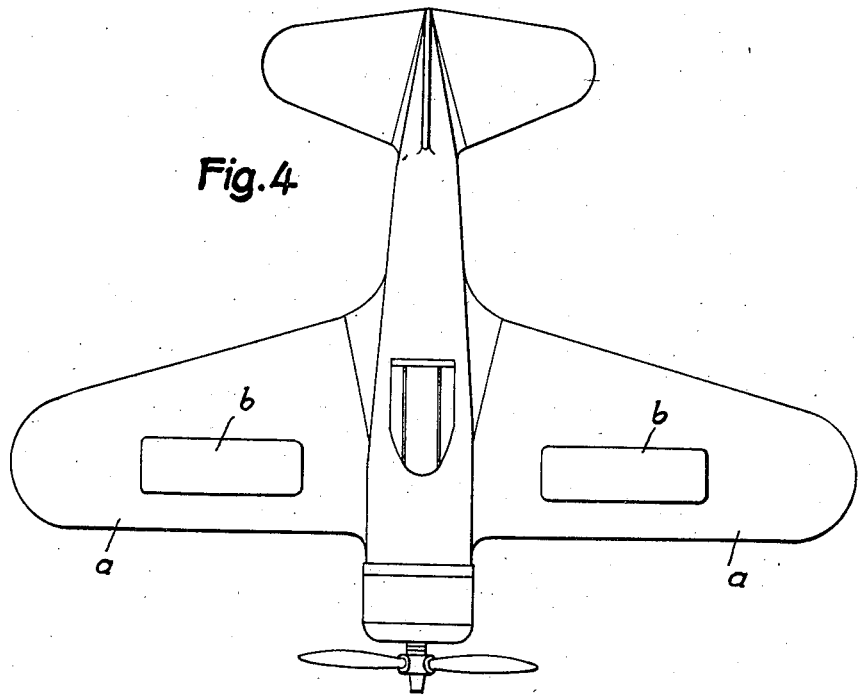

Fig. 3 and 4 are, respectively, a front view and a top view of an aeroplane provided with wings according to Figs. 1 and 2.

The aeroplane wing construction according to Figs. 1 and 2 comprises a main wing $a$ and an auxiliary wing $b$ which can be raised and lowered on the main wing $a$. The main wing $a$ is provided on its upper side with a trough-like cavity $c$, the cross section of which substantially corresponds to the cross section of the auxiliary wing $b$, so that the latter can be fully located therein. In order to raise and lower the auxiliary wing $b$ the aeroplane is provided with a control device which may be operated mechanically or hydraulically. In the present case the said control device comprises two forward and two rearward cylindrical guide-sleeves $d$ and $e$, respectively, the first ones of which are rigidly connected to the frame work of the main wing $a$, whilst the rearward sleeves $e$ are pivoted thereon as shown in the drawing. The said guide-sleeves $d$ and $e$ contain sliding rods $f$ articulated at the front and rear ends of the auxiliary wing $b$ and acted upon by pressure springs $h$ located in the said sleeves (Fig. 2ª), said springs being able to press the sliding rods upwards into their working position shown in Fig. 2, in order to keep the auxiliary wing $b$ fully raised above the main wing $a$. At the lower end of the sliding rods $f$ there are fixed traction cables $i$ by means of which the said rods can be drawn back into the sleeves $d$ and $e$ from the pilot's seat against the action of the said pressure springs, thus lowering the auxiliary wing $b$ down into the trough-like cavity $c$ as shown in Fig. 1.

It is obvious that the auxiliary wing $b$ can be tilted by means of the said traction cables into any inclined position with regard to the main wing $a$, as it is shown in Fig. 2 by dot-and-dash lines. It clearly results from Fig. 1 that in the lowered position of the auxiliary wing $b$, the upward surface of the auxiliary wing $b$ and the corresponding surface of the main wing $a$ are substantially at the same level so that there will be no increase of the resistance of the air. For restraining the effect of eddies within the cavity $c$ when the auxiliary wing $b$ is raised, it may be advantageous to provide the main wing, if desired, with lateral slide-covers $m$ controllable from the pilot's seat, adapted to allow the top closure of the cavity $c$, as indicated in Fig. 2 by dot-and-dash lines.

In Figs. 3 and 4 an aeroplane is shown which is provided with wings of the construction illustrated in the Figs. 1 and 2.

In the raised position of the auxiliary wings $b$ the later contribute to increase the lifting effect of the aircraft. As the incident angle of the auxiliary wings $b$ can be readily adjusted at will with regard to the main wings $a$, the pilot disposes of the additional means for regulating the lifting effect of the aeroplane. Owing to the present invention it is also possible substantially to improve the start and the lifting effect of an aeroplane by tilting the auxiliary wings and to thus reduce the starting distance. If the auxiliary wings are drawn down after the start and again located within the main wings, the consequence thereof will be that owing to the reduction of the total bearing surface area and of the air resistance, the speed of the aeroplane is increased. Before landing the auxiliary wings are again lifted, whereby the total area of the bearing surfaces is increased as well as the air resistance, thus greatly diminishing the landing speed. By altering the incident angle of the auxiliary wings the landing speed can moreover be regulated.

What I claim is:

1. An aircraft wing system comprising a main wing having a recess in the anterior top surface thereof, means for increasing the lift of said main wing consisting of an auxiliary wing located in said recess having an exposed surface which is aligned with the surface of said main wing, telescoping means rigidly connected to said main wing and articulated to said auxiliary wing adjacent the leading edge thereof for moving the leading edge of said auxiliary wing relative to said main wing and telescoping means pivotally connected to said main wing and to said auxiliary wing adjacent the trailing edge thereof for moving the trailing edge of said auxiliary wing relative to said main wing and to vary the angle of incidence of said auxiliary wing when displaced relative to said main wing.

2. An aircraft wing system comprising a main wing having a recess in the anterior top surface thereof, means for increasing the lift of said main wing consisting of an auxiliary wing located in said recess having an exposed surface which is aligned with the surface of said main wing, telescoping means rigidly connected to said main wing and articulated to said auxiliary wing adjacent the leading edge thereof for moving the leading edge of said auxiliary wing relative to said main wing, telescoping means pivotally connected to said main wing and to said auxiliary wing adjacent the trailing edge thereof for moving the trailing edge of said auxiliary wing relative to said main wing and to vary the angle of incidence of said auxiliary wing when displaced relative to said main wing, and said telescoping means at both edges of said auxiliary wing being entirely encased in said main wing when said auxiliary wing is disposed in said recess.

3. An aircraft wing system comprising a main wing having a recess therein, an auxiliary wing located in said recess having an exposed surface which is aligned with the surface of said main wing, telescoping means rigidly connected to said main wing and articulated to said auxiliary wing adjacent the leading edge thereof for moving the leading edge of said auxiliary wing relative to said main wing, telescoping means pivotally connected to said main wing and to said auxiliary wing adjacent the trailing edge thereof for moving the trailing edge of said auxiliary wing relative to said main wing and to vary the angle of incidence of said auxiliary wing when displaced relative to said main wing, said telescoping means at both edges of said auxiliary wing being entirely encased in said main wing when said auxiliary wing is disposed in said recess, resilient means located in said telescoping means for moving said auxiliary wing from said recess and means under the control of the pilot for collapsing said telescoping means to withdraw said auxiliary wing into said recess.

4. An aircraft wing system comprising a main wing having a recess therein, an auxiliary wing located in said recess having an exposed surface which is aligned with the surface of said main wing, two forwardly disposed guide sleeves rigidly connected to said main wing, sliding rods positioned in said guide sleeves pivotally connected to said auxiliary wing at the leading edge thereof, two rear guide sleeves pivotally connected to said main wing, sliding rods disposed in said rear guide sleeves pivotally connected to the trailing edge of said auxiliary wing and combined elastic and traction means for moving said rods in their respective guide sleeves to raise and lower said auxiliary wing relative to said main wing.

ANTOINE GAZDA.